(12) United States Patent
Daems et al.

(10) Patent No.: US 9,528,260 B2
(45) Date of Patent: Dec. 27, 2016

(54) INSULATION BOARD (71) Applicant: Huntsman International LLC, The Woodlands, TX (US)

(72) Inventors: Diana Daems, Kortenberg (BE); Lue Van Essche, Kortenberg (BE)

(73) Assignee: Huntsman International LLC, The Woodlands, TX (US)

( * ) Notice: Subject to any disclaimer, the term of this patent is extended or adjusted under 35 U.S.C. 154(b) by 103 days.

(21) Appl. No.: 14/380,729

(22) PCT Filed: Feb. 27, 2013

(86) PCT No.: PCT/EP2013/053897
§ 371 (c)(1),
(2) Date: Aug. 25, 2014

(87) PCT Pub. No.: WO2013/143798
PCT Pub. Date: Oct. 3, 2013

(65) Prior Publication Data
US 2015/0020474 A1    Jan. 22, 2015

(30) Foreign Application Priority Data
Mar. 26, 2012    (EP) .................................... 12161194

(51) Int. Cl.
E04B 1/76    (2006.01)
B32B 15/04    (2006.01)
(Continued)

(52) U.S. Cl.
CPC . *E04B 1/76* (2013.01); *B32B 5/18* (2013.01); *B32B 15/046* (2013.01); *B32B 15/08* (2013.01);
(Continued)

(58) Field of Classification Search
CPC .......... B32B 5/18; B32B 15/046; B32B 15/08; B32B 15/20; B32B 27/10; B32B 27/40; B32B 37/20; B32B 2250/40; B32B 2255/06; B32B 2255/12; B32B 2255/26; B32B 2266/0278; B32B 2307/102; B32B 2307/304; B32B 2419/00; E04B 1/76; E04B 1/80; E04B 2001/7691; E04C 2/205; E04C 2/284; E04C 2/292; E04C 2/296; E04F 13/0875; Y10T 428/249991; Y10T 428/31547; Y10T 428/31551; Y10T 428/31591; Y10T 428/31605; C08L 75/00
(Continued)

(56) References Cited

U.S. PATENT DOCUMENTS

| 5,352,510 A * | 10/1994 | Laughlin et al. | 428/304.4 |
| 2006/0084777 A1* | 4/2006 | Bleys et al. | 528/44 |

(Continued)

FOREIGN PATENT DOCUMENTS

| CN | 101109220 | 1/2008 |
| EP | 1431473 | 6/2004 |
| EP | 2210991 | 7/2010 |

Primary Examiner — Thao T Tran
(74) Attorney, Agent, or Firm — Huntsman International LLC (57) ABSTRACT

External wall insulation system comprising a high efficient insulation layer of rigid polyurethane or polyisocyanurate foam provided on at least one side with a facing, preferably a gastight (aluminum) layer, and a base layer provided on at least one of the surfaces of the facing wherein said base layer is a polyurethane layer or a polyisocyanurate layer.

10 Claims, 2 Drawing Sheets

PIR - Alu - Coating (51) Int. Cl.
*B32B 37/20* (2006.01)
*B32B 15/20* (2006.01)
*B32B 27/40* (2006.01)
*B32B 5/18* (2006.01)
*B32B 27/10* (2006.01)
*B32B 15/08* (2006.01)
*E04B 1/80* (2006.01)

(52) U.S. Cl.
CPC ............... *B32B 15/20* (2013.01); *B32B 27/10* (2013.01); *B32B 27/40* (2013.01); *B32B 37/20* (2013.01); *E04B 1/80* (2013.01); *B32B 2250/40* (2013.01); *B32B 2255/06* (2013.01); *B32B 2255/12* (2013.01); *B32B 2255/26* (2013.01); *B32B 2266/0278* (2013.01); *B32B 2307/102* (2013.01); *B32B 2307/304* (2013.01); *B32B 2419/00* (2013.01); *E04B 2001/7691* (2013.01); *Y10T 428/249991* (2015.04); *Y10T 428/31547* (2015.04); *Y10T 428/31551* (2015.04); *Y10T 428/31591* (2015.04); *Y10T 428/31605* (2015.04)

(58) Field of Classification Search
USPC ......... 428/423.1, 425.1, 425.8, 319.3, 422.8; 156/324; 52/741.3, 741.4; 528/85
See application file for complete search history.

(56) References Cited

U.S. PATENT DOCUMENTS

| | | |
|---|---|---|
| 2010/0136346 A1 | 6/2010 | Gurke et al. |
| 2011/0008629 A1 | 1/2011 | Davidson et al. |
| 2011/0214373 A1* | 9/2011 | Brandt et al. .............. 52/309.13 |
| 2012/0121887 A1 | 5/2012 | Van de Braak et al. |
| 2014/0212619 A1* | 7/2014 | Vairo et al. .................... 428/57 |

* cited by examiner

Figure 3:
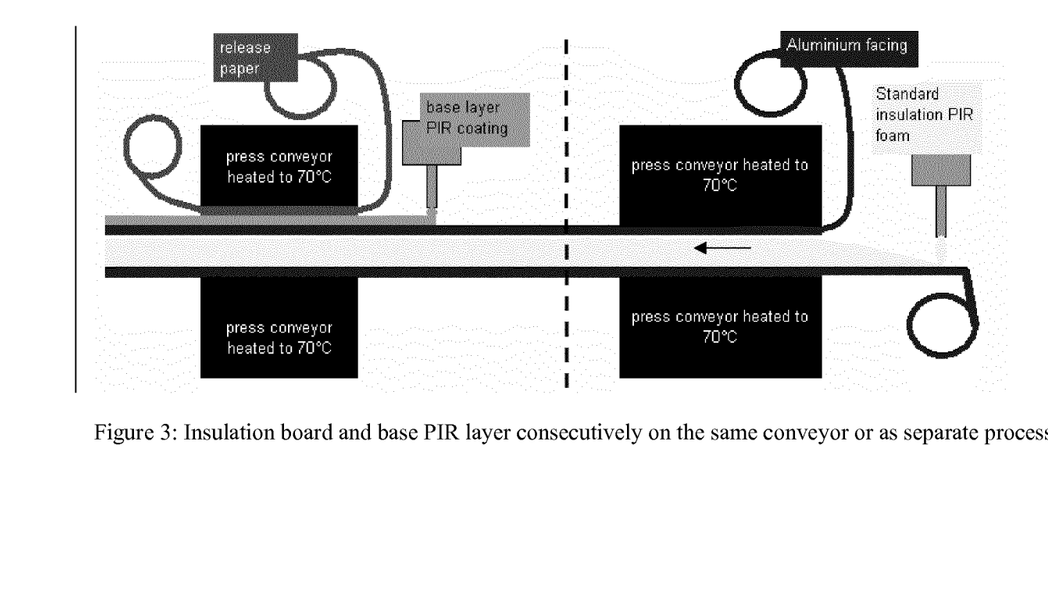

Figure 3: Insulation board and base PIR layer consecutively on the same conveyor or as separate process

Figure 4

INSULATION BOARD

This application is the National Phase of International Application PCT/EP2013/053897 filed Feb. 27, 2013 which designated the U.S. and which claims priority to Foreign Application No. 12161194.1 filed Mar. 26, 2012. The noted applications are incorporated herein by reference.

The present invention relates to a multilayer insulation board for building facades.

Insulation panels for building facades are used for heat and sound insulation of buildings and additionally also provide a suitable surface for the exterior plaster.

External wall insulation systems for thermally insulating an outside wall of a building generally comprise an insulation layer attached to an outer surface of said wall and a finishing layer attached to an outer surface of said insulating layer.

Such systems are known from practice. A known system for instance comprises an insulating layer of, for instance, polystyrene or mineral wool that can be connected to an outer surface of an outside wall of a building, for example, by means of dowels, anchors or adhesive. On an outer surface of the insulating layer a finishing layer is provided which comprises for instance different plaster layers possibly with reinforcing elements or other suitable finishing layers (e.g. mineral or polymer based plasters). This external wall insulating system can, for instance, be used to thermally insulate existing buildings or newly built buildings. At the same time the system may prevent moisture or outer external influences from reaching the wall.

CN 101109220 describes a thermal insulation decorative panel for walls with good thermal insulation performance, which can either be of two layers, in which one is a rigid polyurethane foam layer and the other is a polyurethane layer or a surface plate, with the surface plate being a metal plate (e.g. aluminium panel, zinc foil panel, iron panel), an inorganic plate (e.g. silicon calcium panel, chlorine magnesium panel) or a composite plate (e.g. aluminium-plastic composite panel), for the rigid polyurethane foam layer to be attached inwards to a wall or floor; or which can be of three layers, in which on a rigid polyurethane foam layer, a polyurethane layer is disposed and on the polyurethane layer a coating layer or a decorative layer is disposed.

EP 1431473 describes an insulation panel for building facades containing at least one material from the group consisting of expanded polystyrene rigid foam, extruded polystyrene foam, polyurethane rigid foam or phenol rigid foam with two outer faces whereof a first outer face is intended to form the outside of the insulation façade to be formed with the insulation panel and the second outer face is intended to adjoin the building wall. In one embodiment the insulation panel comprises two layers: a thick inner layer which forms the abutment to the building wall, made of high heat-insulating polyurethane foam and a thin outer layer made of polystyrene which has less good thermal insulation properties than polyurethane foam but exhibits adhesion to cementitious plastering facades.

EP 2210991 describes an external wall insulation system for thermally insulating an outside wall of a building, the system comprising an insulating layer attached to an outer surface of said wall and a finishing layer attached to an outer surface of said insulating layer wherein the insulating layer is a composite layer comprising a substantially high efficient insulation layer facing the wall, which high efficiency insulation layer is adapted to provide efficient insulation properties to the wall, optionally provided with a laminate layer on one or both surfaces, and a glued-on polystyrene base layer facing the finishing layer, which base layer is adapted to cooperate with the finishing layer so as to provide an efficient application base for the finishing layer.

In these prior art external wall insulation systems the insulating layer is composed by bonding of the polystyrene base layer onto the high efficient insulation layer, for instance, by means of a polyurethane adhesive.

It is an object of the present invention to provide an external wall insulation system with improved insulation performance and that can be made in a more economically attractive way.

The insulation board of the present invention comprises a high efficient insulation layer provided on at least one side with a facing and a base layer provided on at least one of the facing outer surfaces wherein said base layer is derived from polyisocyanate and comprises e.g. a polyurethane coating or a polyisocyanurate coating.

The presently claimed external thermal insulated system provides sufficient adhesion to the render, protection of underlying facing during use phase through hydroscopic buffering, impact protection, control of surface flatness to achieve optimal flatness of wall (possibility to smoothen the wall surface once the panels are installed via a simple Shaving process) and no delamination of facing either during drying of mortar (because of forces that occur) or during the lifetime of the wall.

Further aluminium facings or other gastight facings can be applied in order to achieve low thermal conductivity (lambda <25 mW/mK); the polyurethane or polyisocyanurate base layer adheres sufficiently to the aluminium. Also the aluminium facing is protected from mortar by the base layer so as to avoid corrosion of the aluminium or discoloration of the render.

The presently claimed insulation system complies with stringent requirements on panel dimensional stability (≤3%, preferably ≤1% change in length, width, thickness) and meets the reaction to fire criteria (EN 13501-1 class E and DIN 4102 B2).

According to the present invention the polystyrene base layer of the prior art external thermal insulation systems is replaced by a polyurethane or polyisocyanurate coating.

The advantage of the presently claimed insulation systems include better thermal insulation, improved adhesion between all the layers over the lifetime of the insulation board, thinner board and the possibility of in-situ manufacture of the polyisocyanate base layer (the coating can be applied together with the insulation layer and facings in a continuous one-step production process) whereas the polystyrene base layer of the prior art needs to be applied via adhesive to the underlying layers.

The high efficient insulation layer preferably has a thermal heat transfer coefficient at RT of less than or equal to 28 mW/mK, preferably less than 25 mW/mK, and is for instance a rigid polyurethane foam layer, a rigid polyisocyanurate foam layer, a phenol layer or the like.

The high efficient insulation layer may also comprise vacuum panels (hence already provided with a gastight facing) and the like as long as the high efficient insulation layer has a low thermal conductivity coefficient and provides efficient insulation properties with a relatively small thickness of the insulating layer.

The high efficient insulation layer may comprise a reinforcing structure, preferably spaced apart from and substantially parallel with a surface of the high efficient insulation layer facing the base layer. Such a reinforcing structure may for instance be a meshed tissue of polypropylene and be positioned nearby a laminate layer facing the base layer. The reinforcing structure provides a more even distribution of forces applied to the high efficient insulation layer by the dowels or screws or other attachment means that are used for mounting the composite insulating layer to the outside surface of the wall. The forces are distributed along a relatively large surface area, which prevents tearing and cracking of the finishing layer of the system.

Preferably the high efficient insulation layer comprises a polyurethane or most preferably polyisocyanurate foam.

Figure 1:
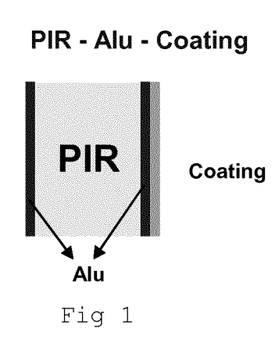

On one or preferably both of the surfaces of the high efficient insulation layer, laminate layers, e.g. aluminium film layers, are attached to achieve the gas tightness of the high efficient insulation layer. On the outer surface of the high efficient insulation layer, thus the surface of the aluminium film facing away from the wall, the base layer is provided (see FIG. 1).

Alternatively gas open facings such as paper, glass fleece or other cost effective material is provided as facing material.

Figure 2:
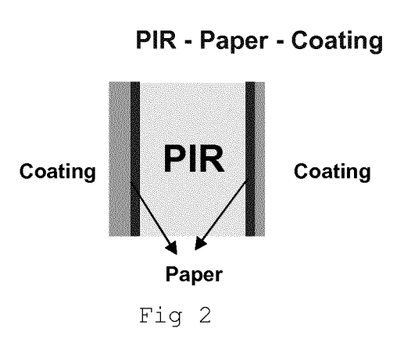

In case facings are provided on both surfaces the base layer can then also be applied on both facings (see FIG. 2).

The polyisocyanate-based coating is dispensed onto the laminated high efficiency insulation layer thus providing damage protection, moisture protection, improved dimensional stability and render adhesion to the thermal insulation board.

Figure 4:
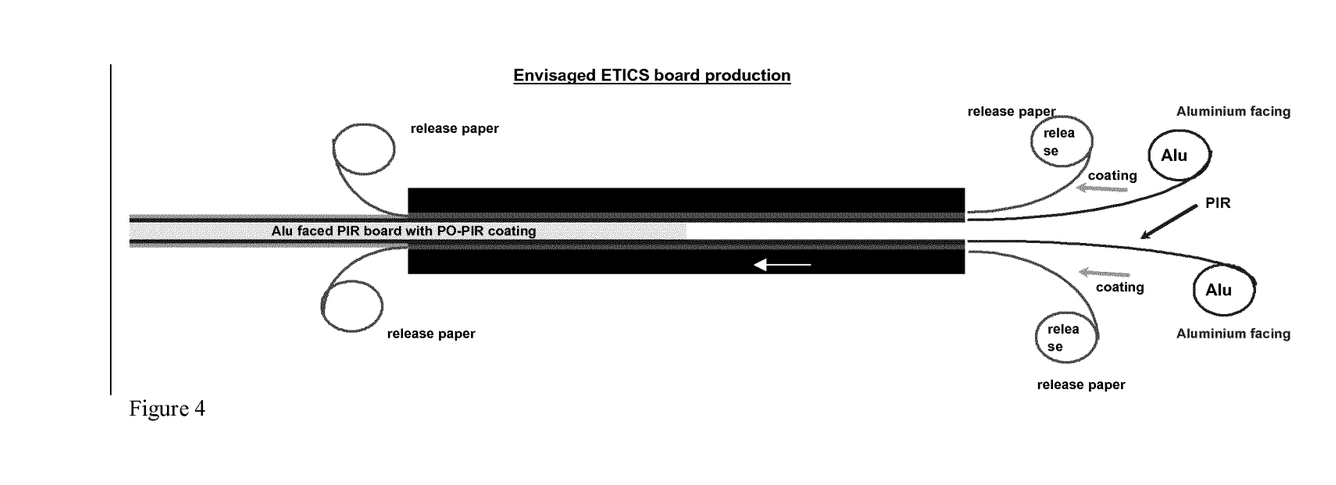

The insulation board of the present invention is generally manufactured by continuous lamination whereby the base polyisocyanate coating is dispensed on the high efficient thermal insulating layer that is faced with either a gastight facing like aluminium or a gasopen facing such as paper just before entering into the press (see FIG. 4). As such the insulation foam and the base coating are made simultaneously.

Alternatively the base layer can be applied consecutively on the same conveyor (see FIG. 3).

Or boards comprising the high efficient thermal insulating layer provided with facing(s) are first made, optionally stored for a certain period of time, and then the base polyisocyanate coating is dispensed on the boards.

The external wall insulation systems of the present invention provide a high level insulation and at the same time an efficient foundation for application of the finishing layer. The high efficient insulation layer is adapted to provide efficient insulation with a limited thickness and the base layer is adapted to cooperate with the finishing layer to be applied so as to provide an efficient adherence basis for the finishing layer. The insulation properties are mainly determined by the high efficient insulation layer and for a minor part by the base layer.

The base layer generally has a smaller thickness than the thickness of the high efficient insulation layer. The base layer only needs to have a minimized thickness because the insulating properties of the system are provided by the high efficient insulation layer but at the same time should be thick enough to thoroughly hold the finishing layer.

The high efficient insulation layer preferably has a thickness of approximately between 50 and 300 mm. The base layer preferably has a thickness of approximately between 1 and 50 mm, preferably 1 and 20 mm, most preferably 1 and 10 mm.

The total thickness of the insulation board is advantageously in the range between 50 and 400 mm, preferably between 50 and 200 mm or between 80 and 400 mm depending on the usage and material of the board.

The base layer is adapted to cooperate with the finishing layer so as to provide an efficient adherence basis for the finishing layer. Preferably, the complete insulation board complies with ETAG 2004 Guideline for European Technical Approval of External Thermal Insulation-Composite systems with rendering. This guideline describes minimum requirements for the insulation product such that the finishing layer can be easily applied and adhered to the outer surface of the insulating layer without risk of detaching, cracking and the like.

The adherence between the respective layers of the external wall insulation system is preferably such that the respective layers stay in a connected position, i.e. the desired connection, when a tensile strain of at least 80 kPa is applied to said external wall insulation system. This means that each respective connection between two neighbouring layers preferably has to withstand a tensile strain of at least 80 kPa to comply with a desired performance of the external wall insulation system.

The adhesion between the base layer and the finishing layer is preferably at least 80 kPa, the adhesion between the base layer and the facing is preferably at least 100 kPa.

An advantage of the present base layer is that in case the outer surface of the wall is uneven and consequently the outer surface of the insulating layer is uneven as well, the outer surface can be levelled in an easy manner by abrasion of part of the material of the base layer. This provides an even adherence foundation for the finishing layer.

The finishing layer may comprise at least one of an organic or inorganic plaster layer. The finishing layer may for instance comprise at least one of a multitude of a plaster layer, a resin layer or other suitable layers, such as brick slip layers, tile layers, stone slap layers, to cope with weather conditions and prevent the insulating layer from contacting moisture, air and the like such that the quality of the external wall insulation system is maintained. The finishing layer at the same time determines the appearance of the building.

The insulating layer may comprise composite insulating panels including part of said high efficient insulating layer and said base layer. Such panels can be easily handled and applied to the wall.

To apply the external wall insulation system to a wall, the insulating layer is attached to an outer surface of a wall. The insulating layer is applied such that the high efficient insulation layer faces the wall and the base layer faces away from the wall. The insulating layer can be mounted to the wall by means of wall clamps, dowels or screws or any other suitable attachment means, for instance suitable adhesives. After attaching the insulating layer on the wall, the finishing layer can be applied onto the outer surface of the insulating layer, thus on the outer surface of the base layer.

A first plaster layer may be spread along the entire outer surface of the insulating layer. The first plaster layer may for instance also comprise a reinforcing mesh. Onto the first plaster layer a second plaster layer, a brick strip layer, a tile layer or the like may be applied. Plaster layers may for instance comprise mineral or polymer based plasters. The finishing layers covers the insulating layer to protect said insulating layer from outside influences and provides a nice aesthetic appearance of the wall.

Preferably morter based renders are used as finishing layer since they provide better adhesion than renders with a high plaster content.

The base layer of the present invention can be any type of coating based on polyisocyanate such as polyurethane and polyisocyanurate coating as known in the prior art.

In the context of the present invention the following terms have the following meaning:

Isocyanate index of NCO index or index: the ratio of NCO-groups over isocyanate-reactive hydrogen atoms present in a formulation, given as a percentage. In other words the NCO-index expresses the percentage of isocyanate actually used in a formulation with respect to the amount of isocyanate theoretically required for reacting with the amount of isocyanate-reactive hydrogens used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of the water) present at the actual polymerisation stage are taken into account.

The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

Reaction system: a combination of components wherein the polyisocyanates are kept in one or more containers separate from the isocyanate-reactive components.

The expression "polyisocyanurate polyurethane material" as used herein refers to cellular or non-cellular products as obtained by reacting the mentioned polyisocyanates and isocyanate-reactive compositions in the presence of trimerization catalysts at a high index, optionally using foaming agents, and in particular includes cellular products obtained with water as reactive foaming agent (involving a reaction of water with isocyanate groups yielding urea linkages and carbon dioxide and producing polyurea-polyisocyanurate-polyurethane foams).

The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

The word "average" refers to number average unless indicated otherwise.

Most preferably the base layer is derived from a polyisocyanurate polyurethane material using a polyether polyol having a high oxyethylene content and a polyisocyanate having a high diphenylmethane diisocyanate (MDI) content as described in WO 2004/111101, incorporated herein by reference. Using such a coating leads to faster cure of the coating, a smoother surface and improved fire performance.

The process for preparing said polyisocyanurate polyurethane materials comprises reacting a polyisocyanate and an isocyanate-reactive composition wherein the reaction is conducted at an isocyanate index of 150 to 1500, the polyisocyanate consists of a) 80 to 100% by weight of diphenylmethane diisocyanate comprising at least 40%, preferably at least 60% by weight of 4,4'-diphenylmethane diisocyanate and/or a variant of said diphenylmethane diisocyanate which variant is liquid at 25° C. and has an NCO value of at least 20% by weight (polyisocyanate a), and b) 20 to 0% by weight of another polyisocyanate (polyisocyanate b), and wherein the isocyanate-reactive composition consists of a) 80 to 100% by weight of a polyether polyol having an average nominal functionality of 2 to 6, an average equivalent weight of 150 to 1000, an average molecular weight of 600 to 5000, an oxyethylene (EO) content of 75 to 100% by weight, and b) 20 to 0% by weight of one or more other isocyanate-reactive compounds excluding water, the amount of polyol a) and compound b) being calculated on the total amount of this polyol a) and compound b).

Preferably the polyisocyanate a) is selected from 1) a diphenylmethane diisocyanate comprising at least 40%, preferably at least 60% by weight of 4,4'-diphenylmethane diisocyanate and the following preferred variants of such diphenylmethane diisocyanate; 2) a carbodiimide and/or uretonimine modified variant of polyisocyanate 1), the variant having an NCO value of 20% by weight or more; 3) a urethane modified variant of polyisocyanate 1), the variant having an NCO value of 20% by weight or more and being the reaction product of an excess of polyisocyanate 1) and of a polyol having an average nominal hydroxyl functionality of 2-4 and an average molecular weight of at most 1000; 4) a prepolymer having an NCO value of 20% by weight or more and which is the reaction product of an excess of any of the aforementioned polyisocyanates 1-3) and of a polyol having an average nominal functionality of 2-6, an average molecular weight of 2000-12000 and preferably an hydroxyl value of 15 to 60 mg KOH/g, and 5) mixtures of any of the aforementioned polyisocyanates. Polyisocyanates 1) and 2) and mixtures thereof are preferred as polyisocyanate a).

Polyisocyanate 1) comprises at least 40% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI.

It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example SUPRASEC MPR ex Huntsman Polyurethanes, which is a business of Huntsman International LLC (who owns the SUPRASEC trademark).

The carbodiimide and/or uretonimine modified variants of the above polyisocyanate 1) are also known in the art and commercially available; e.g. SUPRASEC 2020, ex Huntsman Polyurethanes.

Urethane modified variants of the above polyisocyanate 1) are also known in the art, see e.g. The ICI Polyurethanes Book by G. Woods 1990, $2^{nd}$ edition, pages 32-35. Aforementioned prepolymers of polyisocyanate 1) having an NCO value of 20% by weight or more are also known in the art. Preferably the polyol used for making these prepolymers is selected from polyester polyols and polyether polyols and especially from polyoxyethylene polyoxypropylene polyols having an average nominal functionality of 2-4, an average molecular weight of 2500-8000, and preferably an hydroxyl value of 15-60 mg KOH/g and preferably either an oxyethylene content of 5-25% by weight, which oxyethylene preferably is at the end of the polymer chains, or an oxyethylene content of 50-90% by weight, which oxyethylene preferably is randomly distributed over the polymer chains.

Mixtures of the aforementioned polyisocyanates may be used as well, see e.g. The ICI Polyurethanes Book by G. Woods, 1990, $2^{nd}$ edition, pages 32-35. An example of such a commercially available polyisocyanate is SUPRASEC 2021 ex Huntsman Polyurethanes.

The other polyisocyanate b) may be chosen from aliphatic, cycloaliphatic, araliphatic and, preferably, aromatic polyisocyanates, such as toluene diisocyanate in the form of its 2,4- and 2,6-isomers and mixtures thereof and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate and polymethylene polyphenylene polyisocyanates may be used as well.

When polyisocyanates are used which have an NCO functionality of more than 2, the amount of such polyisocyanates used is such that the average NCO functionality of the total polyisocyanate used in the present invention is 2.0-2.2 preferably.

Polyether polyol a) having a high EO content is selected from those having an EO content of 75-100% by weight calculated on the weight of the polyether polyol. These polyether polyols may contain other oxyalkylene groups like oxypropylene and/or oxybutylene groups. These polyols have an average nominal functionality of 2-6 and more preferably of 2-4, an average equivalent weight of 150-1000 and a molecular weight of 600-5000, preferably of 600-3000. If the polyol contains oxyethylene groups and another oxyalkylene group like oxypropylene, the polyol may be of the type of a random distribution, a block copolymer distribution or a combination thereof. Mixtures of polyols may be used. Methods to prepare such polyols are known and such polyols are commercially available; examples are Caradol 3602 from Shell, Lupranol 9205 from BASF, Daltocel F526 ex Huntsman Polyurethanes (Daltocel is a trademark of Huntsman) and G2005 ex Uniqema. Preferably they are used in an amount of 90-100% by weight.

The other isocyanate-reactive compounds b), which may be used in an amount of 0-20% by weight and preferably 0-10% by weight, may be selected from chain extenders, crosslinkers, polyether polyamines, polyester polyols and polyether polyols (different from the above described ones) having a molecular weight of more than 500 and in particular from such other polyether polyols, which may be selected from polyoxypropylene polyols, polyoxyethylene polyoxypropylene polyols having an oxyethylene content of less than 75% by weight and polyoxyethylene polyoxypropylene polyols having a primary hydroxyl content of less than 70%. Preferred polyoxyethylene polyoxypropylene polyols are those having an oxyethylene content of 5-30% and preferably 10-25% by weight, wherein all the oxyethylene groups are at the end of the polymer chains (so-called EO-capped polyols) and those having an oxyethylene content of 60-90% by weight and having all oxyethylene groups and oxypropylene groups randomly distributed and a primary hydroxyl content of 20-60%, calculated on the number of primary and secondary hydroxyl groups in the polyol. Preferably these other polyether polyols have an average nominal functionality of 2-6, more preferably 2-4 and an average molecular weight of 2000-10000, more preferably of 2500-8000.

The isocyanate-reactive chain extenders, which have a functionality of 2, may be selected from amines, aminoalcohols and polyols; preferably polyols are used. Further the chain extenders may be aromatic, cycloaliphatic, araliphatic and aliphatic; preferably aliphatic ones are used. The chain extenders have a molecular weight of 500 or less. Most preferred are aliphatic diols having a molecular weight of 62-500, such as ethylene glycol, 1,3-propanediol, 2-methyl-1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 2,2-dimethyl-1,3-propanediol, diethylene glycol, dipropylene glycol and tripropylene glycol, and aromatic diols and propoxylated and/or ethoxylated products thereof. The crosslinkers are isocyanate-reactive compounds having an average molecular weight of 500 or less and a functionality of 3-8. Examples of such crosslinkers are glycerol, trimethylolpropane, pentaerythritol, sucrose, sorbitol, mono-, di- and triethanolamine, ethylenediamine, toluenediamine, diethyltoluene diamine, polyoxyethylene polyols having an average nominal functionality of 3-8 and an average molecular weight of 500 or less like ethoxylated glycerol, trimethyol propane, pentaerythritol, sucrose and sorbitol having said molecular weight, and polyether diamines and triamines having an average molecular weight of 500 or less; most preferred crosslinkers are the polyol crosslinkers.

Still further the other isocyanate-reactive compounds may be selected from polyesters, polyesteramides, polythioethers, polycarbonates, polyacetals, polyolefins or polysiloxanes. Polyester polyols which may be used include hydroxyl-terminated reaction products of dihydric alcohols such as ethylene glycol, propylene glycol, diethylene glycol, 1,4-butanediol, neopentyl glycol, 1,6-hexanediol or cyclohexane dimethanol or mixtures of such dihydric alcohols, and dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polythioether polyols, which may be used, include products obtained by condensing thiodiglycol either alone or with other glycols, alkylene oxides, dicarboxylic acids, formaldehyde, amino-alcohols or aminocarboxylic acids. Polycarbonate polyols which may be used include products obtained by reacting diols such as 1,3-propanediol, 1,4-butanediol, 1,6-hexanediol, diethylene glycol or teraethylene glycol with diaryl carbonates, for example diphenyl carbonate, or with phosgene. Polyacetal polyols which may be used include those prepared by reacting glycols such as diethylene glycol, triethylene glycol or hexanediol with formaldehyde. Suitable polyacetals may also be prepared by polymerising cyclic acetals. Suitable polyolefin polyols include hydroxy-terminated butadiene homo- and copolymers and suitable polysiloxane polyols include polydimethylsiloxane diols.

Mixtures of the aforementioned other isocyanate-reactive compounds may be used as well. Preferably the other isocyanate-reactive compounds are polyols selected from the above preferred ones.

The polyols may comprise dispersions or solutions of addition or condensation polymers in polyols of the type described above. Such modified polyols, often referred to as "polymer polyols" have been fully described in the prior art and include products obtained by the in situ polymerisation of one or more vinyl monomers, for example styrene and/or acrylonitrile, in the above polyether polyols, or by the in situ reaction between a polyisocyanate and an amino- and/or hydroxy-functional compound, such as triethanolamine, in the above polyol. Polyoxyalkylene polyols containing from 1 to 50% of dispersed polymer are particularly useful. Particle sizes of the dispersed polymer of less than 50 microns are preferred.

Still further the following optional ingredients may be used: catalysts enhancing the formation of urethane bonds like tin catalysts such as tin octoate and dibutyltindilaurate, tertiary amine catalysts like maleate esters and acetate esters; surfactants; foam stabilisers like siloxane-oxyalkylene copolymers; fire retardants; smoke suppressants; UV-stabilizers; colorants; microbial inhibitors; organic and inorganic fillers, impact modifiers, plasticizers and internal mould release agents.

Any compound that catalyses the isocyanate trimerisation reaction (isocyanurate-formation) can be used as trimerisation catalyst in the process according to the present invention, such as tertiary amines, triazines and most preferably metal salt trimerisation catalysts.

Examples of suitable metal salt trimerisation catalysts are alkali metal salts or organic carboxylic acids. Preferred alkali metals are potassium and sodium, and preferred carboxylic acids are acetic acid and 2-ethylhexanoic acid.

Most preferred metal salt trimerisation catalysts are potassium acetate (commercially available as Polycat 46 from Air Products and Catalyst LB from Huntsman Polyurethanes) and potassium 2-ethylhexanoate (commercially available as Dabco K15 from Air Products). Two or more different metal salt trimerisation catalysts can be used in the process of the present invention.

The metal salt trimerisation catalyst is generally used in an amount of up to 5% by weight based on the isocyanate-reactive composition, preferably 0.1 to 3% by weight. It may occur that the polyol used in the process still contains metal salt from its preparation which may then be used as the trimerisation catalyst or as part of the trimerisation catalyst.

The polyurethane material may be a solid or blown (microcellular) material. Microcellular materials are obtained by conducting the reaction in the presence of a blowing agent, like hydrocarbons, hydrofluorocarbons, hydrochlorofluorocarbons, gases like $N_2$ and $CO_2$, and water. Most preferably water is used as the blowing agent. The amount of blowing agent will depend on the desired density. The amount of water will be less than 5, preferably less than 3 and most preferably about 1.5 to 2% by weight calculated on the weight of the isocyanate-reactive composition. Density reduction may also be achieved by the incorporation of expanded or expandable microspheres like Expancel or hollow glass microbeads.

The reaction to prepare the material is generally conducted at an NCO index of 150 to 1500.

The density of the materials is generally higher than 50 kg/m$^3$, preferably higher than 75 kg/m$^3$.

In general, the isocyanate-reactive ingredients and catalysts may be pre-mixed, optionally together with the optional ingredients, before being brought into contact with the polyisocyanate.

The various aspects of this invention are illustrated, but not limited by the following examples.

EXAMPLE 1

SUPRASEC 5025 ex Huntsman: a polyisocyanate prepolymer based on MDI of average isocyanate functionality 2.7 and NCO value 30.7% (polyisocyanate content 62%, diisocyanate content 38%)

DALTOLAC 8200 ex Huntsman: polyether polyol, sorbitol based, nominal functionality 4.6, OH value 380 mg KOH/g and equivalent weight 148

Simulsol TOFP ex Seppic SA: triol polyether polyol, nominal functionality 3, OH value 950 mg KOH/g and equivalent weight 59

DALTOCEL F499 ex Huntsman: polyether polyol with EO-tip content 13 wt %, nominal functionality 3, OH value 35 mg KOH/g and equivalent weight 1600

Silbyk 9410 ex BYK: polyether modified polydimethylsiloxane surfactant

Catalyst LB ex Huntsman: potassium acetate (48.2%) trimerisation catalyst

| System | pbw |
|---|---|
| Daltolac R 200 | 47.42 |
| Simulsol TOFP | 20.32 |
| Daltocel F 499 | 21.46 |
| Silbyk 9410 | 1.07 |
| Cat. LB | 0.91 |
| Water | 0.93 |
|  | 92.11 |
| Ratio: Pol/Iso 100/225 |  |

Standard 80 mm Aluminum faced PIR insulation boards were coated on both sides with a composite of a glass mat and the base layer PIR coating (containing the ingredients listed above) in a press to a loading of either 225 g/m$^2$ or to 900 g/m$^2$ to a thickness of approximately 1 or 2 mm.

Different types of commercial renders were applied to the coated boards and tensile adhesion measured. The results are given in Table 1 below; they are independent of loading or thickness.

TABLE 1

Render adhesion data.
Tensile adhesion BS EN 1607

| Render | adhesion to | Tensile [kpa] |
|---|---|---|
| Mapei Keraflex | PIR coating | 88 |
| Sto Levelluni | PIR coating | 138 |

EXAMPLE 2

SUPRASEC 2015 ex Huntsman: a polyisocyanate prepolymer based on MDI of average isocyanate functionality 2.12 and NCO value 27.47% (polymeric content 20%, diisocyanate content 75.6%)

DALTOCEL F526 ex Huntsman: polyether polyol with EO content 93 wt %, nominal functionality 3, OH value 140 mg KOH/g and equivalent weight 400

TEP: triethyl phosphate fire retardant

Polycat 41 ex Air Products: polyurethane catalyst

Tegostab B 8404 ex Evonik: polyether modified polysiloxane surfactant

Standard 80 mm Aluminum faced PIR insulation boards were coated in a press to a density around 300 to 450 kg/m$^3$ (depends on overpack) to a thickness of approximately 2 mm with the base layer PIR coating containing the following ingredients:

SUPRASEC 2015: 80 wt %
Daltocel F526: 10.5%
TEP: 8%
Polycat 41: 0.15%

Tegostab B8404: 1%
Catalyst LB: 0.05%
Water: 0.3%

These coated boards were submitted to a B2 fire test (standard EN 13501-1 class E). Result was 6 cm.

Dimensional stability of the coated boards was measured according to standard ISO 2796. The results are given in Table 2 below.

The adhesion of various commercially available render material to the coated board was also measured (results in Table 3 below) as well as the adhesion of the coating to the A1 facer (see Table 4).

TABLE 2

Dimensional stability of the coated boards, aged at 70° C., 95% relative humidity

| Dim. Stab | panel no coating | panel with coating on both sides |
|---|---|---|
| width | | |
| 1 day | 0.7 | 0.5 |
| 1 week | 0.9 | 0.6 |
| 8 weeks | 1.2 | 0.8 |
| length | | |
| 1 day | 0.6 | 0.5 |
| 1 week | 1.0 | 0.7 |
| 8 weeks | 1.3 | 1.0 |
| thickness | | |
| 1 day | 1.9 | 0.9 |
| 1 week | 3.0 | 2.9 |
| 8 weeks | 2.9 | 3.9 |

TABLE 3

Adhesion with several renders

| type | Tensile adhesion [kPa] |
|---|---|
| Maxit Multi 285 grey | 350 |
| Sto Novocell | 146 |
| Quickmix SKS-L Lobatherm | 246 |

TABLE 4 coating to Alu adhesion

| Reference = coating to Alu adhesion | 350 |
|---|---|

EXAMPLE 3

| Suprasec 2015 | 75 |
|---|---|
| Daltocel F 526 | 15.25 |
| TEP | 8 |
| Polycat 41 | 0.2 |
| Tegostab B 8404 | 1 |
| Catalyst Lb | 0.05 |
| Water | 0.5 |

Standard 100 mm Aluminum faced PIR insulation boards were coated with the above base layer PIR coating in a press on one or both sides to a loading of 140 kg/m$^3$ to a thickness of approximately 2 and 6 mm.

These coated boards were submitted to a small flame fire test (EN 13501-1 Class E). Result is 6 cm (similar to former German B2 test).

Adhesion to various render was measured (see Table 5).

TABLE 5

Adhesion with several renders

| type | Tensile adhesion [kPa] |
|---|---|
| Maxit Multi 285 grey | 200 |
| Mapei Keraflex | 180 |

The invention claimed is:

1. An insulation board comprising a high efficient insulation layer having a thickness of between 50 mm and 300 mm, a facing layer disposed on at least a portion of a side of the insulation layer, and a base layer having a thickness of between 1 mm and 10 mm disposed on at least a portion of the facing layer wherein said base layer is prepared by reacting a polyisocyanate and an isocyanate-reactive composition at an isocyanate index of 150 to 1500, wherein the polyisocyanate consists of a) 80 to 100% by weight of diphenylmethane diisocyanate comprising at least 40% by weight of 4,4'-diphenylmethane diisocyanate and/or a variant of said diphenylmethane diisocyanate which variant is liquid at 25° C. and has an NCO value of at least 20% by weight (polyisocyanate a), and b) 20 to 0% by weight of another polyisocyanate (polyisocyanate b), and wherein the isocyanate-reactive composition consists of a) 80 to 100% by weight of a polyether polyol having an average nominal functionality of 2 to 6, an average equivalent weight of 150 to 1000, an average molecular weight of 600 to 5000, an oxyethylene (EO) content of 75 to 100% by weight, and b) 20 to 0% by weight of one or more other isocyanate-reactive compounds excluding water, the amount of polyol a) and compound b) being calculated on the total amount of this polyol a) and compound b).

2. The insulation board according to claim 1 wherein the high efficient insulation layer is a rigid polyurethane or polyisocyanurate foam.

3. The insulation board according to claim 1 wherein said another facing layer is disposed on another side of the high efficient insulation layer.

4. The insulation board according to claim 3 wherein said facing is aluminium and the base layer is provided on one of the facings.

5. The insulation board according to claim 3 wherein said facing is paper and the base layer is provided on both facings.

6. The insulation board according to claim 1 wherein said base layer is a polyurethane layer or a polyisocyanurate layer.

7. A process for manufacturing an insulation board according to claim 1 by continuous lamination comprising the step of dispensing the base layer on at least a portion of the facing layer just before entering into the press.

8. A process for insulating the outside wall of a building comprising the step of attaching an insulation board according to claim 1 to the wall such that the high efficient insulation layer faces the wall and the base layer faces away from the wall and applying a finishing layer onto at least a portion of the outer surface of the base layer.

9. The process according to claim 8 wherein the finishing layer comprises one or more layers of plaster.

10. A process for manufacturing an insulation board according to claim 3 by continuous lamination comprising the step of dispensing the base layer on at least a portion of the facing layers just before entering into the press.

* * * * *